United States Patent Office 2,900,269
Patented Aug. 18, 1959

2,900,269

PREPARATION OF MOLDED ARTICLES FROM KEROGENIC MINERALS

William C. Bauman and Eldon L. Graham, Midland, Mich., assignors to The Dow Chemical Company, Midland, Mich., a corporation of Delaware No Drawing. Application April 30, 1956
Serial No. 581,313

4 Claims. (Cl. 106—241)

This invention relates to the preparation of useful articles by molding of certain natural carbonaceous materials known variously as oil shales, kerogenic minerals and petrologenic minerals.

Among the mineral deposits found in the earth's crust are those which contain carbonaceous matter of an organic nature. Such carbonaceous minerals differ from each other in a variety of ways, e.g. in regard to the kind of organic matter present, the kind of inorganic matter present and the relative proportions of the several constituents of the mineral. One class of carbonaceous minerals comprises the kerogenic minerals, which are sedimentary deposits laid down in various past geologic ages. The inorganic matter of kerogenic minerals, usually amounting to 50 percent or more by weight of the mineral, is usually clay, limestone, dolomite or mixtures thereof with or without other inorganic mineral matter such as silica and iron pyrites. The organic matter of kerogenic minerals is predominately macerated plant debris and often contains the remains of spores and/or algae. The organic matter has been called "kerogen" in recognition of the fact that minerals which contain such organic matter, although containing no "oil" per se, are capable of yielding a petroleum-like product on pyrolysis. The pyrolysis distillate obtained by retorting kerogenic minerals can be further separated and/or processed by typical refinery practice to produce gasoline, kerosene, wax, pitch and other fractions analogous to those obtainable from petroleum. The kerogenic minerals are distinguishable from other carbonaceous minerals on the basis of chemical and physical composition. The kerogen differs from the organic matter of petroleous deposits such as the so-called "oil sands" or "tar sands" in that petroleous organic matter is soluble in solvents, for example in carbon disulfide, and oil products may be extracted from petroleous minerals or distilled therefrom substantially without chemical change of the organic material. Contrastingly, the complex kerogen is insoluble in carbon disulfide and must be destructively pyrolyzed in order to yield oil products. Kerogenic minerals also distinguish over coals in that the latter have a relatively low proportion of inorganic matter and the organic matter of coal has a high ratio of carbon to hydrogen and an appreciable proportion of fixed carbon, whereas the organic matter of kerogenic minerals has a lower ratio of carbon to hydrogen and has little fixed carbon. It is with kerogenic minerals as characterized above, distinguished from petroleous, i.e. oil-bearing, deposits and distinguished from coals, that the present invention is concerned.

Kerogenic minerals are usually won from the earth by mining operations in which the mineral is obtained as lumps of miscellaneous sizes and irregular shapes. Although varying somewhat depending on the particular source of the deposit, these lumps are usually soft, friable masses which have a laminar structure, characteristic of sedimentary deposits, and in which the kerogen is distributed in minute irregular clusters between layers consisting principally of inorganic matter. Because of these characteristic properties, naturally occurring kerogenic minerals have no practical utility as structural materials.

An object of this invention is to adapt kerogenic minerals to use as structural materials. A particular object is to provide useful articles comprised substantially of kerogenic minerals which articles have characteristic properties not possessed by natural kerogenic minerals. Other objects and advantages will be evident from the following description of the invention.

It has now been discovered that certain kerogenic minerals, e.g. oil shales, can, without separation of the kerogen and inorganic constituents and without the addition of a binder, be molded under conditions hereinafter specified to make integral bodies. The molding operation may be broadly described as the shaping of mineral masses under the influence of heat and pressure, e.g. by compression molding, injection molding, rolling, extrusion and the like. The molded or shaped bodies so obtained are hard, rigid, dense, non-porous, strong and non-laminar, and are, at least to the eye, homogeneous. The bodies may have the form of useful articles which have the shape and surface texture of the mold or die in which they were formed, or such bodies can be further shaped by remolding, cutting, grinding or the like and can be polished or provided with surface coatings.

The kerogenic minerals which are particularly preferred for the practice of this invention are those such as oil shales containing a proportion of kerogen equivalent to at least about 45 gallons of oil per ton of mineral as assayed by the standard Fischer Assay pyrolysis method. Minerals having a proportion of kerogen equivalent to 60 gallons or more of oil per ton of mineral can be employed. A kerogen content expressed as 45 gallons of oil per ton of mineral usually corresponds to about 26 percent by weight, or about 34 percent by volume, of the mineral; other proportions of kerogen are similarly related to oil yield. Lower-kerogen minerals, e.g. minerals having as low as 15 gallons of oil per ton, can be employed by blending such with higher-kerogen minerals in such relative proportions as to produce an average kerogen content as hereinbefore specified.

The kerogenic minerals are preferably freed of gross extraneous matter, if any, and then comminuted and blended before molding. The mineral can be crushed or ground in any suitable attrition mill, preferably to a particle size capable of passing through a standard 50 mesh screen, although larger particles can be employed, particularly for moldings having large masses. No narrow particle size range is necessary, and a comminuted material having particles ranging in size, e.g. from 50 to 350 mesh size, is very satisfactory. In general, the finer particles lead to moldings having a more homogeneous structure. In some instances, simple shapes have been molded from single lumps of kerogenic mineral as obtained directly from the native deposit without grinding or any other treatment except the crushing, pressing and heating action of the molding operation itself.

The molding of the kerogenic mineral is accomplished at a heat plastifying temperature, i.e. a temperature at which the kerogen is plastic and able to flow, but below the temperature at which appreciable degradation of the kerogen can occur, such as from about 200° F. to about 850° F., preferably from about 350° F. to about 600° F. With application of pressure at such temperature, the kerogen is caused to flow together, fusing the organic particles of the mass around the dispersed inorganic matter. In general, a pressure of about 5000 or more pounds per square inch is used, greater pressures being advantageous with lower molding temperatures and with minerals having lower kerogen content. The greater the pressure employed during the molding operation, the more completely consolidated is the molded mass, the more dense and uniform in structure is the product, and the greater is the strength of the product so made. Molding pressures of 10,000 to 20,000 or more pounds per square inch are preferred.

The effect of molding natural kerogenic minerals in the manner herein described appears to be principally a structural one. A noticeable difference between the natural and molded materials is the absence of laminations and cleavage planes from the molded product, thereby contributing to a uniformly sound and strong article. It also appears that the molding operation has changed the natural structure, wherein cells of kerogen are generally coated and isolated with a weak clayey slip, to a new structure in which the kerogen is welded into a generally continuous phase with the inorganic mineral ingredients dispersed as a filler in a strong, organic resin base. It is evident that the molded kerogenic mineral masses, prepared as herein described, are uniquely distinguished from the natural mineral, but the invention is not to be limited by any theory or hypothesis of explanation for these results.

Minor amounts of additive materials may be incorporated with the kerogenic mineral before molding if desired. For example, pigments, fibrous reinforcing materials, metal powders, plasticizers and the like can be added in minor proportions to the mineral.

By molding kerogenic minerals in the manner herein described, useful articles, such as roof, wall and floor tiles, drain pipes, boxes, trays, toys, game devices, vases, lamp and pen bases and the like, can be readily prepared from a widely available, abundant, inexpensive, natural-occurring raw material.

The following examples illustrate ways in which the invention has been practiced, but should not be construed as limiting its scope.

EXAMPLE 1

A sample of colored oil shale whose Fischer Assay value was 60 gallons of oil per ton was ground in a rod mill to a fineness of 50–350 mesh. A five-gram portion of this ground oil shale was compression molded at a temperature of 600° F. and a pressure of 6,000 pounds per square inch to form a game checker or counting chip. The molding had an attractive, smooth, glossy surface, was rigid and hard and had good impact strength.

EXAMPLE 2

Samples of the ground shale described in Example 1 were compression molded at a temperature of 500° F. into tensile strength test bars, having a necked-down portion 1¼ inches by ¼ inch by 3/32 inch. Each molding was made at one of the pressures shown in Table I, wherein is also shown the tensile strength, in pounds per square inch of cross-section, of the resulting molded test bar. All of the moldings were hard, dense, uniform in appearance and smooth surfaced.

*Table I*

| Molding Pressure, Pounds per Square Inch | Tensile Strength |
| --- | --- |
| 5,000 | 1,000 |
| 10,000 | 1,400 |
| 15,000 | 1,850 |
| 20,000 | 2,250 |

EXAMPLE 3

A sample of oil shale from Garfield County, Colorado, having a Fischer Assay value of 66.6 gallons of oil per ton, was ground to pass a 200-mesh screen. The ground material was tamped into a tensile bar mold and preheated to a temperature of 470° F. under a pressure of 4000 p.s.i., whereupon the pressure was increased to 15,000 p.s.i. After three minutes, the molding was cooled under pressure and removed. The molded test bar so obtained was hard and dark brown with a smooth, shiny surface.

The physical properties of the molded oil shale were determined on the test bar in the usual manner as follows:

Tensile strength _____ 1,180 pounds per square inch.
Elongation at break _____ 0.6 percent.
Compressive strength _____ 4,700 pounds per square inch.
Impact strength _____ 3.2 inch-pounds per inch.
Specific gravity _____ 1.58.
Softening temperature (Vicat) 224° F.

We claim:
1. A process of making shaped articles whose tensile strength is at least 1000 pounds per square inch when tested in the form of a bar having a cross-section ¼ inch by 3/32 inch which comprises subjecting to at least 5000 pounds per square inch pressure at a heat-plastifying temperature a material consisting essentially of a kerogenic mineral having a kerogenic equivalent of at least 60 gallons of oil per ton of mineral, said temperature being below the temperature of appreciable decomposition of the kerogen.

2. A process of making shaped articles whose tensile strength is at least 1000 pounds per square inch when tested in the form of a bar having a cross-section ¼ inch by 3/32 inch which comprises heating at a heat-plastifying temperature between about 200° F. and about 850° F. a moldable material consisting essentially of a kerogenic mineral having a kerogenic equivalent of at least 60 gallons of oil per ton of mineral and subjecting such heated material to a pressure of at least 5000 pounds per square inch.

3. A process for making shaped articles whose tensile strength is at least 1000 pounds per square inch when tested in the form of a bar having a cross-section ¼ inch by 3/32 inch which comprises preparing a comminuted material consisting essentially of a kerogenic mineral having a kerogenic equivalent of at least 60 gallons of oil per ton of mineral, heating such material to a heat-plastifying temperature between about 200° F. and 850° F. and subjecting such heated material to a pressure of at least 5000 pounds per square inch.

4. A molded article whose tensile strength is at least 1000 pounds per square inch when tested in the form of a bar having a cross-section ¼ inch by 3/32 inch consisting essentially of the natural ingredients of a kerogenic mineral having a kerogenic equivalent of at least 60 gallons of oil per ton of mineral and pressed at a pressure of at least 5000 pounds per square inch at a heat-plastifying temperature between about 200° F. and about 850° F.

References Cited in the file of this patent

UNITED STATES PATENTS

| 22,115 | Fowler | Nov. 23, 1858 |
| 1,649,545 | Renou | Nov. 15, 1927 |
| 2,079,343 | Fischer et al. | May 4, 1937 |
| 2,404,208 | Bangham et al. | July 16, 1946 |
| 2,461,365 | Bennett et al. | Feb. 8, 1949 |
| 2,466,435 | Jones et al. | Apr. 5, 1949 |

OTHER REFERENCES

Bureau of Mines Bulletin 415, pages 105–118.